2,996,531
PREPARATION OF ALKYLCARBAMOYLMETHYL DIMETHYLPHOSPHORODITHIOATES
Richard W. Young, Riverside, Conn., assignor to American Cyanamid Company, New York, N.Y., a corporation of Maine
No Drawing. Filed July 1, 1957, Ser. No. 668,849
4 Claims. (Cl. 260—461)

This invention relates to the control of insects, mites and other pests. As such it is concerned with a novel method of preparing compounds which are systemically active pesticides of low mammalian toxicity. More specifically, this application is concerned with preparing S-(N-alkylcarbamoylmethyl) dimethylphosphorodithioates, more particularly those which may be represented by the general formula $$\text{Alk-NHCOCH}_2\text{SSP(OCH}_3)_2 \qquad (I)$$

wherein Alk is an alkyl radical selected from methyl, ethyl, n-propyl, i-propyl and t-butyl, and to an improved preparation thereof.

Recently much interest has been shown in the development of systemic insecticides. Such utilization, however, means that a product to be of potential interest not only must be active against the indicated pest but have low mammalian toxicity. For this reason, in the present invention, only those products are considered as useful which meet two requirements. First, in a standard test for systemic activity, at least 50% of the test animals should be killed at concentrations of one part per million or less. Second, in a standard test for acute mammalian toxicity the maximum tolerated dose should be at least 125 mg. per kg.

Surprisingly, these properties are found combined in the group of compounds noted above when the latter are in sufficiently purified form. This limited group of compounds falls within a class of compounds for which a method of preparation is shown in United States Letters Patent 2,494,283.

As shown therein, a carbamoylalkyl chloride or bromide, such as chloroacetamide is reacted in a ketone solvent, such as acetone, with about one molecular equivalent of a salt of a dialkylphosphorodithioic acid and an "alkali-forming metal." The reaction is said to proceed as follows:

While the N-monoalkyl compounds of the present invention may be so prepared, unfortunately the yields of sufficiently purified products are poor. Large amounts of O,O,S-trimethyl phosphorodithioate [$(CH_3)_2PSSCH_3$] are formed, presumably by reaction of the N-monoalkyl phosphorodithioate and the salt of the phosphorodithioic acid. Not only do the N-monoalkyl compounds of the present invention have generally lower melting points than the unsubstituted products, but also a generally higher level of solubility in organic solvents. Isolation of the product from crude reaction mixtures containing large amounts of the trimethyl ester impurity is difficult.

This question of purity is found to be of marked importance, both as to the effectiveness of the agent and as to the question of toxicity. It is, therefore, a principle object of the present invention to develop a procedure whereby better yields of purified product can be more simply and easily obtained.

This object has been surprisingly well accomplished by a novel combination of processing features characterized by the use of a tertiary amine salt of the dialkylphosphorodithioic acid.

In general, the invention comprises bringing the amine salt of the phosphorodithioic acid into reactive contact with the carbamoylalkyl halide in a water-immiscible, hydrocarbon solvent capable of dissolving both the reactants and the product. Reaction is accomplished under agitation at temperatures ranging from room temperature to the boiling point of the solvent mixture. Thereafter agitation is stopped, the solution separated from precipitated by-product salt, as by filtration, the filtrate washed and the product recovered from the filtrate.

Suitable carbamoylalkyl halides and dialkylphosphorodithioic acids for the process of the present invention are known.

In the process of the above-noted patent, salts of dithioic acids and "alkali-forming metals" are used. In contrast therewith, the present invention uses a tertiary amine salt of the dithioic acid. In accordance with the present invention, it has been found that several hundred percent greater weight yields of product can be obtained than from the same amount of reactant fed to the earlier process. For this salt-forming purpose, triethylamine is excellent. Because of its availability it will usually be selected. However, other salt-forming tertiary amines such as trimethyl amine, pyridine, quinoline, dimethylaniline and the like may be used.

Although water is not used in the present process as a solvent during the reaction, the satisfactory organic solvents may be characterized as those substantially immiscible with water. As commonly practiced the solvent component usually will be an unsubstituted aromatic hydrocarbon such as benzene, toluene and the xylenes, or a substituted aromatic such as chlorobenzene and the like. However, others such as chloroform, methylene and ethylene dichlorides, and the like may be used. Saturated hydrocarbon solvents such as hexane, heptane, cyclohexane and the like are not satisfactory because of their low solvent power for the reaction product. Also, the useful solvents in general boil above the melting point of the products. Solvents which boil below about 90–95° C. therefore are to be preferred as facilitating product recovery.

Use of water immiscible solvents has the further advantage that subsequently the immiscible organic solvent solution containing the product may be washed with an aqueous alkaline solution such as sodium carbonate or bicarbonate to remove any unreacted acid.

It is an advantage of the invention that the mode of reactant addition is not critical and the process may originate with either reactant. It is usually convenient to start with a solution of one of the reactants in a suitable solvent. The other reactant is then admixed therewith, either per se or in solution.

While the present process is not critical as to reagent proportions, because of the purification problems which result from an unnecessary excess being present, all reactants should be supplied in about molecularly equivalent amounts. A few percent excess of the amide halide reactant may help in insuring speedy reaction but appreciable excess should be avoided.

In general, the compounds of the present invention are white crystalline solids of relatively low melting point and high solubility in aromatic hydrocarbon, ketone and alcoholic solvents. Since in the present invention the product is in the organic solvent phase, it is readily isolated by washing, as noted above, and then evaporating the solvent. This usually leaves an oily residue which is readily dissolved and recrystallized to well defined products of sharp melting point. Suitable solvents include alcohol, ether, aqueous alcohol and alcohol ether mixtures.

As noted above, a feature of the present invention is the use of tertiary amine salts. The triethyl amine salt being typical will be taken as illustrative. The amine salt may be formed in any desired way, perhaps the simplest being to dissolve the dithioic acid in a suitable solvent such as benzene and add thereto about a molar equivalent of the amine. To this solution is added the amide halide solution or vice versa.

Two procedures are available. The reaction may be carried out in a single organic solvent such as benzene. This will produce better results than are obtained in the process disclosed in the above-noted patent. This forms the subject matter of the present application. However, this should not be confused with the process in which benzene or the like is used as a heterogeneous solvent phase in the presence of water or other immiscible solvent. This forms the subject matter of our copending application, Serial No. 668,875, filed of even date.

Preparation of the products of the present invention may be readily illustrated in the following examples which are intended for that purpose only. Unless otherwise noted, all parts are by weight and temperatures are in degrees centigrade. In each case, analyses for carbon, hydrogen and phosphorous were found to check with the theoretical values.

*Example 1*

To a stirred solution of 173 parts (91% pure; 1.0 mol) of O,O-dimethylphosphorodithioic acid in 1000 parts of benzene there is added 102 parts (1.0 mol) of triethylamine while maintaining the temperature at 25° C. To this solution there is added a solution of 106 parts (1.0 mol) of 2-chloro-N-methylacetamide in 600 parts of benzene and the resultant mixture is stirred at room temperature for 24 hours. After filtration of the precipitated triethylamine hydrochloride, the benzene is distilled off and the product is isolated by cooling the resultant oil and filtering the crystals. Recrystallization from aqueous methanol gives 135 parts of O,O-dimethyl S-(N-methylcarbamoylmethyl) phosphorodithioate, M.P. 52–53°.

*Example 2*

A solution of 24.4 parts (.24 mols) of triethylamine in 20 parts of benzene is added to a stirred solution of 43 parts (.24 mols) of O,O-dimethyl phosphorodithioic acid in 50 parts of benzene, the temperature being maintained between 15–25° C. during the addition. A solution of 36 parts (.242 mol) of 2-chloro-N-t-butylacetamide in 50 parts of benzene is added and the reaction mixture stirred at room temperature for 23 hours. The triethylamine hydrochloride is filtered out and the filtrate is washed successively with 5% aqueous sodium bicarbonate and with saturated sodium chloride solution. The benzene solution is dried over anhydrous magnesium sulfate and then concentrated under vacuum to give 58 parts of an oily residue. This residue is recrystallized from absolute ether to give 30 parts of O,O-dimethyl S-(N-t-butylcarbamoylmethyl) phosphorodithioate, M.P. 58–60.5°.

*Examples 3–8*

The procedure of Example 1 was followed but substituting molecular equivalent amounts of different carbamoylalkyl halides. The latter, which may be represented by the illustrative formula $$\text{Alk—NHCOCH}_2\text{Cl} \qquad (\text{II})$$

are indicated in the following Table I by reference to the group "Alk" in Formula II. It also corresponds to the same symbol in Formula I above. The melting points shown in Table I are for product compounds of Formula I wherein "Alk" has the indicated value. Products of Examples 1 and 2 are included.

| Ex. No. | "Alk" | Product M.P. (° C.) |
|---|---|---|
| 1 | methyl | 52–53 |
| 2 | t-butyl | 58–60.5 |
| 3 | ethyl | 67–68 |
| 4 | n-propyl | 63.5–64 |
| 5 | i-propyl | 76–77 |
| 6 | allyl | 57.5–58 |
| 7 | n-butyl | 30.5–31 |
| 8 | isobutyl | 68.5–69 |

*Example 9*

A solution of 20 parts (0.25 mol) of pyridine in 50 parts of toluene is added to a stirred solution of 46 parts (0.25 mol) of O,O-dimethylphosphorodithioic acid in 50 parts of toluene, the temperature being held below 30° during the addition. A solution of 27 parts (0.25 mol) of 2-chloro-N-t-butylacetamide in 50 parts of toluene is added, and the mixture warmed to 50° for 6 hours. After cooling the suspension, the pyridine hydrochloride is filtered out and the filtrate is washed as in Example 2. A yield of 28 parts of product, M.P. 58–60°, is obtained.

*Example 10*

In order to compare the present process with the prior use of a ketone solvent in a single phase, 196 parts of potassium O,O-dimethyl phosphorodithioate is dissolved in 1800 parts of acetone, and 107 parts of 2-chloro-N-methylacetamide is added thereto. The mixture is stirred at 25–30° for 72 hours. Acetone was distilled off, and the residue was taken up in toluene. Forty-five parts of product (M.P. 50–51°) was recovered on working up as in Example 1. On the basis of dithioate charged, the procedures of Examples 1–9 produced 200–400% higher weights of product.

I claim:

1. An improved method of preparing an S-(N-monoalkylcarbamoylmethyl)-O,O - dimethylphosphorodithioate for use as a systemic insecticide of low mammalian toxicity which method comprises: forming a reaction mixture consisting essentially of (1) substantially equimolecular proportions of (a) an N-monoalkylcarbamoylmethyl halide and (b) a salt of O,O-dimethylphosphorodithioic acid and a tertiary amine; and (2) a solvent consisting essentially of a single water-immiscible aromatic hydrocarbon, said solvent being present in amount at least sufficient to dissolve all said halide and all said salt; agitating said mixture at a temperature in the range from room temperature up to about the boiling point of the reaction mixture, whereby said phosphorodithioate is formed and an insoluble tertiary amine halide is formed and precipitated, said solvent being present also in sufficient amount to dissolve all said product dithioate; stopping said agitation; removing said precipitated halide and recovering said product from residual solution.

2. A process according to claim 1 in which said tertiary amine is a trialkylamine.

3. A process according to claim 1 wherein said solvent is an organic solvent selected from the group consisting of benzene, toluene, xylene and chlorobenzene.

4. A process according to claim 1 in which the alkyl of said N-monoalkylcarbamoylmethyl halide is selected from the group consisting of methyl, ethyl, n-propyl, isopropyl and tertiary butyl.

References Cited in the file of this patent

UNITED STATES PATENTS

| | | |
|---|---|---|
| 2,494,283 | Cassaday et al. | Jan. 10, 1950 |
| 2,627,523 | Hook et al. | Feb. 3, 1953 |
| 2,725,333 | Buntin | Nov. 29, 1955 |
| 2,736,726 | Gaetzi et al. | Feb. 28, 1956 |
| 2,862,017 | Schrader et al. | Apr. 24, 1956 |
| 2,864,849 | Schrader | Aug. 28, 1956 |

FOREIGN PATENTS

F 18,068 Germany _____ July 5, 1956